United States Patent

[11] 3,627,239

[72] Inventor Thomas N. Hull, Jr.
 Marblehead, Mass.
[21] Appl. No. 30,073
[22] Filed Apr. 20, 1970
[45] Patented Dec. 14, 1971
[73] Assignee General Electric Company

[54] AIRCRAFT ENGINE FUEL SYSTEM
 5 Claims, 2 Drawing Figs.
[52] U.S. Cl....................................................... 244/135 R,
 60/39.28
[51] Int. Cl........................................................ B64d 37/34
[50] Field of Search............................................ 244/135;
 210/416; 60/39.28

[56] References Cited
 UNITED STATES PATENTS
3,073,377  1/1963  Robinson ..................... 60/39.2

FOREIGN PATENTS
735,913  5/1953  Great Britain................  60/39.28

Primary Examiner—Trygve M. Blix
Assistant Examiner—Gregory W. O'Connor
Attorneys—Edward S. Roman, Derek P. Lawrence, Frank L. Neuhauser, Oscar B. Waddell and Joseph B. Forman ABSTRACT: An engine fuel system is disclosed for use in conjunction with an aircraft fuel transfer system wherein high-pressure fuel from the engine system is provided to power jet pumps for delivering fuel from the aircraft fuel tanks to the engine and for transferring fuel between two aircraft tanks. The engine fuel system includes means associated with the engine boost pump wherein clean fuel is withdrawn from the boost pump and provided to a jet motive flow pump, which pressurizes the extracted fuel and supplies it to the jet pumps of the aircraft fuel transfer system.

PATENTED DEC 14 1971  3,627,239
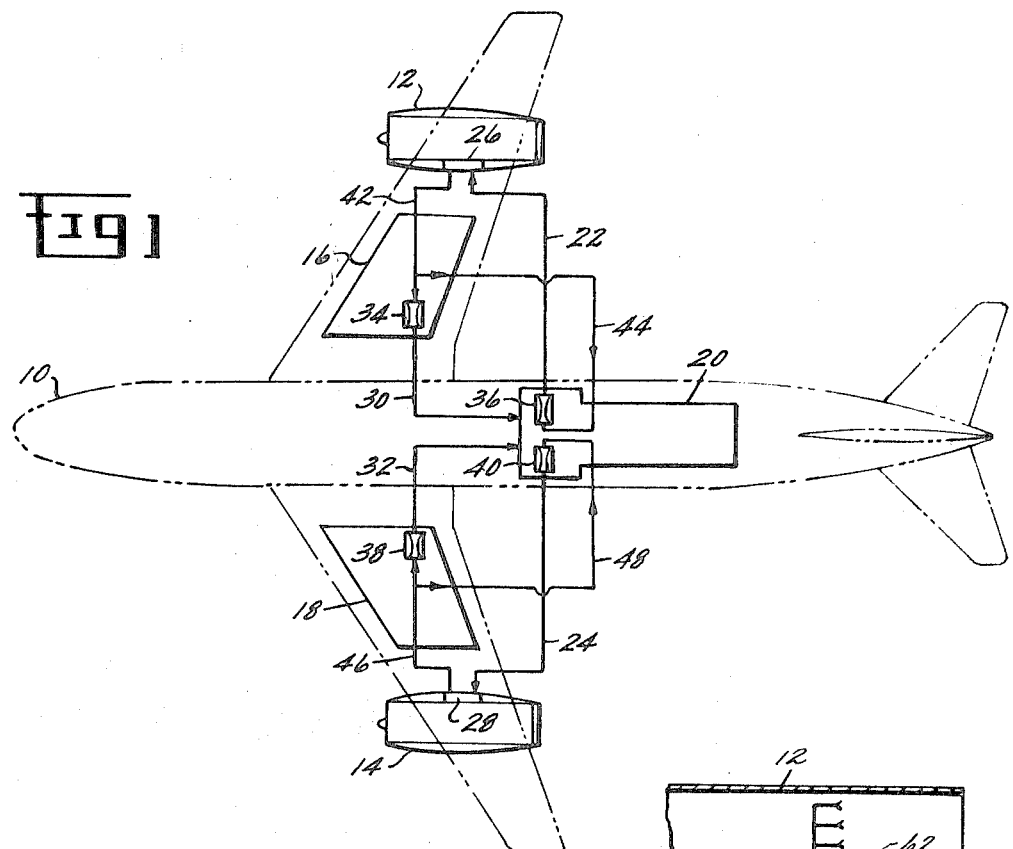
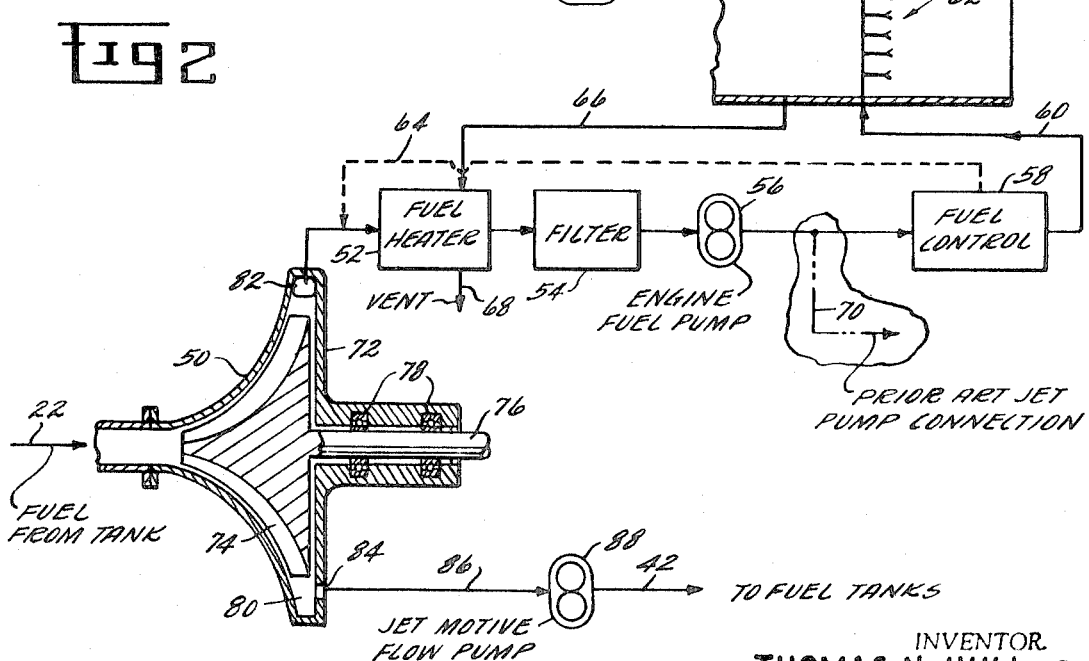
INVENTOR.
THOMAS N. HULL, JR.
BY
ATTORNEY 3,627,239

AIRCRAFT ENGINE FUEL SYSTEM

BACKGROUND OF THE INVENTION

Aircraft fuel systems are required to operate under less than ideal conditions in that the various fuel system components, such as pumps and control devices, are susceptible to clogging and excessive wear caused by particulate contaminants in the fuel unless means are provided for filtering or otherwise removing such contaminants from the critical components in the system. Thus, it is common to provide various filtering devices in aircraft fuel system. In addition, means are provided upstream of the fuel filters to heat the fuel to a temperature above the freezing temperature of water and thereby eliminate clogging of contamination sensitive system components with ice particles which form in the fuel system from the small amount of water normally present therein. These fuel heaters are ordinarily heated by a small flow of compressor air bled from the compressor of the jet engine. Bleeding of high-pressure air from the engine compressor for this and other purposes will cause a decrement in the maximum possible engine performance, which performance penalty should desirably be minimized. One way of minimizing the performance penalty contributed to by fuel heating requirements is, of course, to minimize magnitude of the heating problem.

In many aircraft fuel systems, motive energy for transferring fuel from the aircraft fuel tank to the engine fuel system and for transferring fuel between aircraft fuel tanks is provided by diverting a small percentage of the high-pressure engine fuel flow and supplying it to jet pumps in mil. fuel tanks. While being contamination sensitive to a certain degree, the components in the aircraft fuel transfer system are not as sensitive as the engine fuel control components and thus do not require the high degree of filtering that is required for the engine main fuel pump and other high-pressure components. In the prior art, aircraft fuel transfer systems have, however, been supplied with jet motive fluid from the high-pressure or discharge side of the engine main fuel pump, the apparent advantage being that utilization of the existing high-pressure source, avoids adding hardware to the engine. Applicant has determined, however, that the supposed advantage cited above is illusory in that the heating required to deice the fuel supplied to the aircraft system results in a decrement in engine specific fuel consumption on long-range low-speed missions which outweighs the supposed advantages of using the engine main fuel pump discharge as a jet motive fuel source. He has therefore invented an engine fuel system in which only the fuel required for delivery to the engine through the more contamination-sensitive main fuel pump and main fuel control are heated with compressor discharge air, and other means are provided for decontaminating and deicing fuel supplied to the aircraft transfer pumps.

SUMMARY OF THE INVENTION

Briefly stated, the invention is an aircraft engine fuel system which comprises a boost pump, fuel heater, filter, engine fuel pump, and fuel control in series with the main combustor nozzles of the engine and additionally includes separate means for centrifugally separating solid contaminants, including ice particles, from a portion of the engine system inlet fuel stream and pressurizing said decontaminated portion to a relatively high pressure and transferring it to the aircraft fuel system.

BRIEF DESCRIPTION OF THE DRAWINGS

While the specification concludes with claims particularly pointing out and distinctly claiming the invention, it is more readily understandable by reference to the text below and the accompanying drawings in which:

FIG. 1 is a schematic view of an aircraft fuel system; and

FIG. 2 is a schematic view of an aircraft engine fuel system.

DESCRIPTION OF THE PREFERRED EMBODIMENT

FIG. 1 illustrates the outline of an aircraft 10 which has two engines 12, 14. Fuel is carried on B00)'0MIL. aircraft by wing tanks 16, 18 and by a fuselage tank 20. Fuel lines 22, 24 are provided to transfer fuel from the main tank 20 to the fuel systems 26, 28 of engines 12, 14 respectively. Additionally, transfer lines 30, 32 are provided to transfer fuel from wing tanks 16, 18 to the fuselage mounted main tank 20. Pumping the fuel in the aircraft system is accomplished by jet pumps 34, 36, 38 and 40 which are respectively supplied with high-pressure motive fluid from the fuel systems 26, 28 of engines 12, 14 by motive fluid lines 42, 44, 46 and 48. The system described is representative of aircraft fuel systems in general and is presented to illustrate the environment in which the invention described below operates. The invention, of course, would be equally applicable to any other number of variations of the aircraft fuel system illustrated.

FIG. 2 illustrates an engine fuel system 26 (see FIG. 1) which comprises a boost pump 50 having its inlet connected to fuel line 22 (see FIG. 1) and a fuel heater 52, filter 54, high pressure pump 56, and fuel control 58, from which the fuel is supplied in metered quantities by a conduit 60 to fuel nozzles 62 on engine 12. A bypass line 64 is provided to return fuel not required by fuel nozzles 62 to the inlet of fuel heater 52. In fuel heater 52, fuel is heated by heat exchange with compressor discharge air entering heater 52 through compressor discharge air line 66 and vented through conduit 68. Filter 54 is required because of the contamination sensitivity of fuel control 58, which to accomplish its metering function necessarily operates with close clearance valves whose operation can be adversely affected by contaminant particles, and is also required to reduce wear deterioration of the fuel pump 56. Heater 52 must be provided to assure that particles formed from small amounts of water present in aircraft fuels will not clog filter 54, or if they pass filter 54 will not clog or otherwise damage pump 56 or control 58.

Prior art systems for providing high-pressure jet motive flow to the aircraft fuel transfer system such as the one shown in FIG. 1 included a bleed line 70 which diverted a portion of the high-pressure output of pump 56 to the jet pumps in the aircraft system. As can be seen from the drawings, the prior art system requires a fuel heater whose capacity is in excess of that required if only the fuel required by the engine for combustion were heated, which in turn requires a relatively higher percentage of bleed from the compressor to heat the fuel. The prior art system, does, however have the apparent advantage of providing jet motive flow to the aircraft fuel system with a minimum of engine fuel system components. It has been found, however, that this apparent advantage is illusory in many aircraft systems inasmuch as the compressor discharge air required to heat the jet motive fuel flow causes a decrement in engine performance which exceeds the supposed advantage to be gained from minimizing the number of fuel system components. Accordingly, the applicant has invented a fuel system which comprises centrifugal separating means to separate ice particles and other solid contaminants out of the fuel to the degree necessary for satisfactory operation of the aircraft fuel transfer system jet pumps without passing the jet motive fluid flow through the fuel heater 52.

In one embodiment, the centrifugal separating means is integrated with centrifugal boost pump 50. Pump 50 comprises a housing 72 in which an impeller 74 is rotatably mounted by securement to a shaft 76 supported by bearing means 78. Housing 72 includes a diffuser around the periphery of impeller 74. Main fuel discharge from diffuser 80 to fuel heater 52 is accomplished through an outlet opening 82 located adjacent the periphery of diffuser 80. A clean flow outlet 84 is located adjacent the periphery of impeller 74 and connected by a conduit 86 to a separate jet motive flow pump 88 wherein the centrifuged flow is pressurized to a pressure adequate to power jet pumps 34, 36, 38, and 40 (see FIG. 1).

An alternative to using a boost pump structure as shown in FIG. 2 would be to provide a separate centrifugal separator between boost pump 50 and fuel heater 52. Its clean flow discharge would be directed into conduit 86 and thence supplied to the aircraft fuel transfer system while its uncleaned flow would be passed through the remainder of the engine fuel system comprising heater 53, filter 54, pump 56 and fuel control 58, as shown in FIG. 2.

Operation of the system is as follows. Fuel from the main fuel tank 20 (see FIG. 1) is supplied to the inlet of pump 50 by conduit 22. Impeller 74 is driven from engine 12 and creates a centrifugal force field which causes solid contaminants in the fuel to pass across impeller 80 to the periphery of diffuser 80 and thence pass with the main fuel flow into heater 52 and filter 54 wherein the contaminants are removed to a degree sufficient to enable dependable operation of the fuel control 58. The jet motive fuel flow is withdrawn as relatively contaminant free flow into outlet 84 and thence discharged through conduit 86 to jet motive flow pump 88, which pressurizes the fuel thus diverted and delivers it back to the fuel tanks through conduit 42. Sufficient deicing of the jet motive flow is accomplished by the centrifugal separation effect which takes place in boost pump 50 to enable dependable operation of the components in the aircraft fuel transfer system, thus eliminating any requirement to heat the jet motive fuel flow, elimination of which requirement permits better specific fuel consumption by the aircraft engine.

Having above described a preferred embodiment of the invention, though not exhaustive of all possible equivalents, what is desired to be secured by Letters Patent is distinctly claimed and particularly pointed out in the claims appearing below.

What is claimed is:

1. An aircraft engine fuel system adapted to provide a quantity of pressurized fuel to operate the pumping system for an aircraft fuel transfer system, said fuel system comprising:

centrifugal contaminant-separating means adapted for connection to a fuel supply line from the aircraft fuel tanks, said separating means having a cleaned flow outlet and an uncleaned flow outlet;

means connected to said cleaned flow outlet for pressurizing fuel derived therefrom and delivering it to the aircraft fuel transfer system wherein the fuel so pressurized operates as the motive fluid for effecting a flow of fuel from said fuel tanks;

combustion fuel delivery means connected to said uncleaned flow outlet for heating, cleaning, and metering fuel flow to the aircraft engine for combustion.

2. The fuel system recited in claim 1 wherein said combustion fuel delivery means comprises in series a fuel heater, fuel-filtering means, high-pressure pumping means, and fuel-metering means.

3. The fuel system recited in claim 2 wherein said fuel heater is a heat exchanger adapted to derive its heating medium from the engine compressor.

4. The fuel system recited in claim 3 wherein said centrifugal contaminant separating means is a centrifugal pump which includes means for diverting fuel from its diffuser at a point radially inward from the diffuser periphery.

5. The fuel system recited in claim 1 wherein said pressurizing and delivering means includes a pressurizing pump for pressurizing fuel received from said cleaned flow outlet; conduit means for flowing said pressurized fuel to said fuel tanks and jet pump means within each fuel tank and operated by said pressurized fuel for flowing additional fuel from said tanks.

* * * * *